US008863669B2

(12) United States Patent
Young et al.

(10) Patent No.: US 8,863,669 B2
(45) Date of Patent: Oct. 21, 2014

(54) VERSATILE CONTROL OF A LINEAR SYNCHRONOUS MOTOR PROPULSION SYSTEM

(75) Inventors: Jason A. Young, Marlborough, MA (US); P. Eric Malkowski, Lancaster, MA (US); Brian M. Perreault, Stow, MA (US); Michael F. Onorato, Acton, MA (US)

(73) Assignee: Magnemotion, Inc., Devens, MA (US)

( * ) Notice: Subject to any disclaimer, the term of this patent is extended or adjusted under 35 U.S.C. 154(b) by 14 days.

(21) Appl. No.: 13/490,995

(22) Filed: Jun. 7, 2012

(65) Prior Publication Data

US 2013/0008336 A1    Jan. 10, 2013

Related U.S. Application Data

(60) Provisional application No. 61/494,005, filed on Jun. 7, 2011.

(51) Int. Cl.
*B60L 13/03* (2006.01)
*B60L 15/00* (2006.01)

(52) U.S. Cl.
CPC .............. *B60L 15/005* (2013.01); *Y02T 10/648* (2013.01); *Y02T 10/644* (2013.01)
USPC ................... 104/292; 246/182 R; 246/187 R

(58) Field of Classification Search
CPC ......... B60L 15/00; B60L 15/02; B60L 15/05; B60L 13/03; B60L 13/00; B60L 13/10
USPC ........ 246/182 R, 182 A, 187 R, 187 A, 34 A; 104/290, 292; 318/38, 295, 297, 135
See application file for complete search history.

(56) References Cited

U.S. PATENT DOCUMENTS 527,857 A    10/1894    Hutin et al.
3,513,338 A    5/1970    Poloujadoff
(Continued)

FOREIGN PATENT DOCUMENTS

CN    101378931 A    3/2009

OTHER PUBLICATIONS

International Search Report & Written Opinion, Application No. PCT/US2010/21839, mailed Mar. 26, 2010. (15 Pages).

(Continued)

*Primary Examiner* — Mark Le
(74) *Attorney, Agent, or Firm* — Nutter McClennen & Fish LLP; David J. Powsner

(57) ABSTRACT

Control of Linear Synchronous Motors involves a number of low level issues of motor control—such as sensing precise position, controlling current in stator windings, and obeying commands from high level controllers—and high level vehicle control—such as stopping and starting, switching and merging, limiting speed and acceleration, synchronizing relative motion, preventing collisions and accidents, and dealing with failures. In most cases there is a master controller that directs vehicles based on simple commands but in other cases it is desirable to allow an external agent to provide more detailed control—such as synchronizing motion between a vehicle and a robot or allowing human operator control. This patent describes a versatile control scheme that allows both simplified high level control and, when or where necessary, control by an external agent. The result is a transport system and method that provides efficient and precise movement of vehicles on a guideway.

11 Claims, 4 Drawing Sheets

(56) References Cited

U.S. PATENT DOCUMENTS

| | | |
|---|---|---|
| 3,706,922 A | 12/1972 | Inagaki |
| 3,938,018 A | 2/1976 | Dahl |
| 4,061,089 A | 12/1977 | Sawyer |
| 4,160,181 A | 7/1979 | Lichtenberg |
| 4,311,853 A | 1/1982 | Cree |
| 4,311,953 A | 1/1982 | Fukuda et al. |
| 4,352,960 A | 10/1982 | Dormer et al. |
| 4,415,959 A | 11/1983 | Vinciarelli |
| 4,538,214 A | 8/1985 | Fisher et al. |
| 4,635,560 A | 1/1987 | Ballantyne |
| 4,736,747 A | 4/1988 | Drake |
| 4,873,677 A | 10/1989 | Sakamoto et al. |
| 4,892,980 A | 1/1990 | Riley |
| 4,920,318 A | 4/1990 | Misic et al. |
| 5,055,775 A | 10/1991 | Scherz et al. |
| 5,094,172 A | 3/1992 | Kummer |
| 5,156,092 A | 10/1992 | Hirtz |
| 5,277,285 A | 1/1994 | Musachio |
| 5,293,308 A | 3/1994 | Boys et al. |
| 5,521,444 A | 5/1996 | Foreman |
| 5,528,113 A | 6/1996 | Boys et al. |
| 5,542,356 A | 8/1996 | Richert et al. |
| 5,770,936 A | 6/1998 | Hirai et al. |
| 5,821,638 A | 10/1998 | Boys et al. |
| 5,839,554 A | 11/1998 | Clark et al. |
| 5,839,567 A | 11/1998 | Kyotani et al. |
| 6,011,508 A | 1/2000 | Perreault et al. |
| 6,100,663 A | 8/2000 | Boys et al. |
| 6,101,952 A | 8/2000 | Thornton et al. |
| 6,118,249 A | 9/2000 | Brockmann et al. |
| 6,307,766 B1 | 10/2001 | Ross et al. |
| 6,317,338 B1 | 11/2001 | Boys et al. |
| 6,326,713 B1 | 12/2001 | Judson |
| 6,397,990 B1 | 6/2002 | Brien et al. |
| 6,483,202 B1 | 11/2002 | Boys |
| 6,499,701 B1 | 12/2002 | Thornton et al. |
| 6,578,495 B1 | 6/2003 | Yitts et al. |
| 6,580,185 B2 | 6/2003 | Kang et al. |
| 6,619,212 B1 | 9/2003 | Stephan et al. |
| 6,621,183 B1 | 9/2003 | Boys |
| 6,637,343 B2 | 10/2003 | Stephan et al. |
| 6,651,566 B2 | 11/2003 | Stephan et al. |
| 6,686,823 B2 | 2/2004 | Arntz et al. |
| 6,781,524 B1 | 8/2004 | Clark et al. |
| 6,803,744 B1 | 10/2004 | Sabo |
| 6,834,595 B1 | 12/2004 | Henderson |
| 6,899,037 B1 | 5/2005 | Cowan, Jr. |
| 6,911,747 B2 | 6/2005 | Tsuboi et al. |
| 6,917,136 B2 | 7/2005 | Thornton et al. |
| 6,983,701 B2 | 1/2006 | Thornton et al. |
| 7,134,258 B2 | 11/2006 | Kalany et al. |
| 7,243,752 B2 | 7/2007 | Green et al. |
| 7,432,622 B2 | 10/2008 | Griepentrog et al. |
| 7,448,327 B2 | 11/2008 | Thornton et al. |
| 7,458,454 B2 | 12/2008 | Mendenhall |
| 7,511,250 B2 | 3/2009 | Lindig |
| 7,525,283 B2 | 4/2009 | Cheng et al. |
| 7,538,469 B2 | 5/2009 | Thornton et al. |
| 7,554,316 B2 | 6/2009 | Stevens et al. |
| 7,602,142 B2 | 10/2009 | Weber et al. |
| 7,605,496 B2 | 10/2009 | Stevens et al. |
| 7,633,235 B2 | 12/2009 | Boys |
| 7,714,537 B2 | 5/2010 | Cheng et al. |
| 7,825,537 B2 | 11/2010 | Freer |
| 7,863,861 B2 | 1/2011 | Cheng et al. |
| 7,868,587 B2 | 1/2011 | Stevens et al. |
| 7,913,606 B2 | 3/2011 | Schneider et al. |
| 7,926,644 B2 | 4/2011 | Mendenhall |
| 7,932,798 B2 | 4/2011 | Tolle et al. |
| 7,952,322 B2 | 5/2011 | Partovi et al. |
| 7,952,324 B2 | 5/2011 | Cheng et al. |
| 8,113,310 B2 | 2/2012 | Gurol et al. |
| 2002/0093252 A1 | 7/2002 | Kang et al. |
| 2003/0217668 A1 | 11/2003 | Fiske et al. |
| 2005/0225188 A1 | 10/2005 | Griepentrog et al. |
| 2007/0044676 A1 | 3/2007 | Clark et al. |
| 2007/0283841 A1 | 12/2007 | Lopatinsky et al. |
| 2008/0148990 A1* | 6/2008 | Wamble et al. ............ 104/281 |
| 2009/0107806 A1 | 4/2009 | Mendenhall |
| 2010/0186618 A1 | 7/2010 | King et al. |
| 2010/0200316 A1 | 8/2010 | Gurol et al. |
| 2010/0236445 A1 | 9/2010 | King et al. |
| 2013/0074724 A1 | 3/2013 | King et al. |

OTHER PUBLICATIONS

Chinese Office Action for Application No. 2010800131883, issued Mar. 7, 2013(7 pages) with partial English summary.

International Search Report and Written Opinion mailed Aug. 6, 2012 for Application No. PCT/US2012/041263 (13 Pages).

* cited by examiner

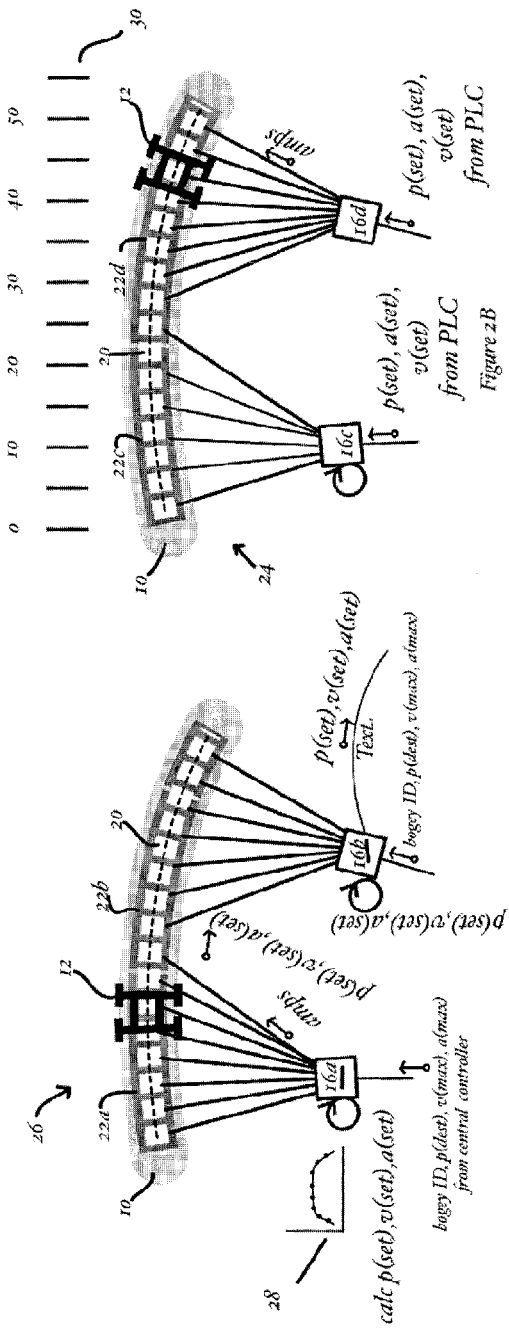
Figure 2A
Figure 2B
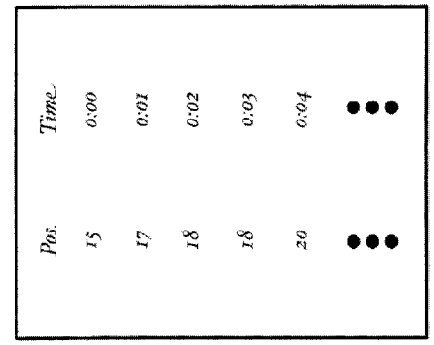
Figure 2C

VERSATILE CONTROL OF A LINEAR SYNCHRONOUS MOTOR PROPULSION SYSTEM

This application claims the benefit of filing of U.S. Patent Application Ser. No. 61/494,005, filed Jun. 7, 2011, entitled Versatile Control of a Linear Synchronous Motor Propulsion System, the teachings of which are incorporated by reference herein.

This application is related to International Application No. PCT/US2010/021839, published Jul. 29, 2010, and to corresponding U.S. patent application Ser. No. 12/692,441, filed Jan. 22, 2010, both entitled "IMPROVED TRANSPORT SYSTEM POWERED BY SHORT BLOCK LINEAR SYNCHRONOUS MOTORS AND SWITCHING MECHANISM," the latter of which is a continuation-in-part of, and both of which claim the benefit of priority of, U.S. patent application Ser. No. 12/359,022, filed Jan. 23, 2009, entitled "Transport System Powered by Short Block Linear Synchronous Motors" and U.S. Provisional Patent Application Ser. No. 61/184,570, filed Jun. 5, 2009, entitled "Improved Transport System Powered By Short Block Linear Synchronous Motors." The teachings of the all of the foregoing are hereby incorporated herein by reference.

BACKGROUND OF THE INVENTION

This invention pertains to the versatile control of Linear Synchronous Motor (LSM) propulsion systems to move objects and people in three dimensions. The objective is to provide the simplest possible high level control without limiting the ability of a controller to optimize performance under a variety of conditions.

The advantages of using LSM propulsion are well known and described in other patents (by way of non-limiting example, U.S. Pat. Application No. US 2010/0236445 and U.S. Pat. Nos. 7,926,644, 7,538,469, 7,458,454, 7,448,327, 6,983,701, 6,917,136, 6,781,524, 6,499,701, 6,101,952, and 6,011,508, all assigned to the assignee hereof and the teachings of which are incorporated herein by reference. A principal problem is to control these motors when a significant number of vehicles are moving in a complex pattern under a variety of external constraints.

One example is the control of a vehicle when its motion must, at places or times, be synchronized to the motion of other objects, such as vehicles, robots, or people. In one example an object is moved in a production line and while in motion a robot is required to interact with the object in a controlled way. Another example is when a vehicle is transporting people under automated control and an operator desires to take control in order to deal with an unexpected event. In this case the operator may change the speed and acceleration, but the system must protect the vehicle from collision that might occur due to improper operator action.

An object of the invention is to provide the user of the LSM propulsion system a control system with options that have the desired degree of flexibility, but do not require the user to be concerned with the lowest levels of detail and do provide protection from failures in the high level or external controllers.

A more general object of the invention is to provide improved transport systems, apparatus and methods.

Another related object of the invention is to provide such systems, apparatus and methods as are adapted for the efficient and precise movement of vehicles and other objects on a guideway.

A related object of the invention is to provide such systems, apparatus and methods as take advantage of LSM technologies.

A further related object of the invention is to provide such systems, apparatus and methods as are adapted for use with manufacturing, production, laboratory and other applications.

SUMMARY OF THE INVENTION

The foregoing are among the objects attained by the invention, which provides in some aspects an LSM-based transport system that includes a guideway with a plurality of propulsion coils disposed along a region in which one or more vehicles disposed on the guideway are to be propelled, as well as electronic power and control circuitry that excites the propulsion coils so as to propel the vehicles along the guideway. The vehicles, according to these aspects of the invention, each include a magnetic flux source—for example, one or more Halbach or other magnet arrays.

Systems according to the foregoing aspect are advantageous for, among other reasons, that the vehicles on the guideway can be moved (or propelled) independently of one another in a controlled fashion—e.g. without risk of collision or uncontrolled motion—regardless of their proximity to other vehicles on the guideway. The guideway, according to the related aspects of the invention, can include guidance structure—such as rails-that facilitate maintaining the vehicles on the guideway—and switches used for merge and diverge.

The control of the LSM propulsion system involves a complex array of issues. Some issues have to do with low level motor controllers that sense vehicle positions and control current in windings so as produce a desired propulsive force and vehicle speed. There are other issues which are the domain of higher level controllers, which monitor vehicle motion to achieve a desired effect. These controllers are, in term, controlled by still higher level controllers that control the movement of many vehicles in what are sometimes complex paths involving stops, starts, merges, switching, synchronization with external events, and response to human operators. This invention shows how the high level control can be done with a minimum of complexity, and without requiring the high level controller to do more than is necessary for safe operation.

Thus, for example, in some embodiments, vehicle motion along the guideway can be specified via limit-based parameters (such as e.g. final-position, max-velocity, and/or max-acceleration in three dimensions) and, alternatively, for at least some zones of the guideway or at some times, by set point parameters (such as e.g. current or desired position, current or desired velocity and/or current or desired acceleration). The result is a transport system and method that provides efficient and precise movement of vehicles on a guideway.

Further aspects of the invention provide methods for operating LSM-based transport system in accord with the above.

These and other aspects of the invention are evident in the drawings and in the text that follows.

BRIEF DESCRIPTION OF THE DRAWINGS

A more complete understanding of the invention may be attained by reference to the drawings, in which:

FIGS. 2A-2C depicts control of vehicle 12 motion in a limit-based parameter control zones and set point-based parameter control zones in a system according to one practice of the invention;

DETAILED DESCRIPTION OF THE ILLUSTRATED EMBODIMENT

Described here is a transport system that utilizes novel guideway architectures that permit vehicle motion to be governed by alternate controls and, thereby, afford varying degrees of motion regulation, e.g., in different zones of the guideway. Thus, for example, in some embodiments, vehicle motion along the guideway can be specified via limit-based parameters (such as, e.g., final-position, max-velocity and/or max-acceleration) and, alternatively, for at least some zones of the guideway, by set point parameters (such as, e.g., current or desired vehicle position, current or desired vehicle velocity and/or current or desired vehicle acceleration). The result is a transport system and method that provides efficient and precise movement of vehicles and other objects on a guideway.

The text that follows describes components and operation of embodiments of the invention, e.g., suitable for manufacturing, assembly and laboratory applications. This is, to an extent, provided in context of systems of the type described in co-pending, commonly assigned, incorporated-by-reference International Application No. PCT/US2010/021839 and U.S. patent application Ser. No. 12/692,441 (hereinafter, referred to as the "incorporated-by-reference applications"). However, it will be understood that many variations on this design are possible and are contemplated by the invention.

Figure 1:
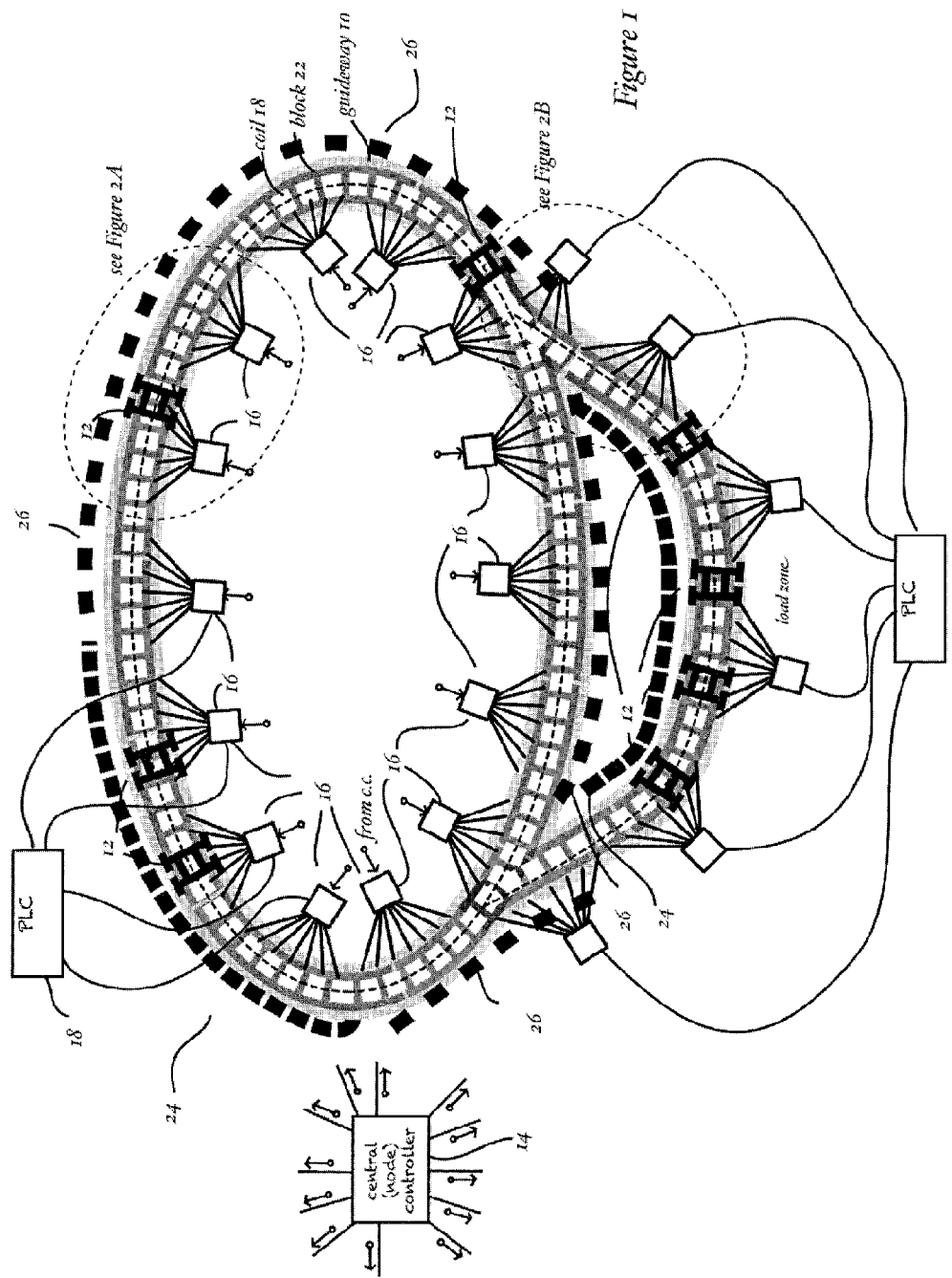
FIG. 1 depicts a linear synchronous guideway and control system according to one practice of the invention.

FIG. 1 depicts a linear synchronous guideway and control system according to one practice of the invention. The illustrated system includes a guideway 10 with vehicles 12 disposed thereon for controlled movement utilizing, generally speaking, linear synchronous motor (LSM) technology.

Motion of the vehicles 12 is, particularly, controlled by digital data processors, here, exemplified by central controller 14, block controllers 16 and programmable logic controller (PLC) 18 (also referred to as "host"). Though not shown in the drawing on account of clutter, the central controller 14 is coupled for communications to the block controllers 16. This may be via direct connection or indirect connection, for example, via daisy-chaining (or other indirect coupling), e.g., through other block controllers.

As will be appreciated by those skilled in the art, the central controller 14 can alternately be referred to as a "node controller" without alteration of meaning, and, similarly, the block controllers 16 can alternately be referred to as "motor controllers," again, without alteration of meaning.

In some embodiments, the central (or node) controller 14 is coupled for communication with all of the block (or motor) controllers 16, while in other embodiments it is coupled for communication with only those block controllers 16 that are not coupled for communication with the PLC 18. As used herein, the phrase "coupled for communication" with the central controller refers to couplings (direct or indirect) in which the block controllers 16 respond to signals generated by the central controller to effect vehicle motion control as discussed below, either in general operation or in override modes of operation.

In the illustrated embodiment, PLC 18 is coupled for communications with a subset of the block controllers 16—namely, those in zones 24 of the guideway referred to below as "set point-parameter controlled." Though the PLC may, in point of fact, be directly or indirectly coupled to all of the block controllers 16—the phrase "coupled for communication" is used here to refer to couplings (direct or indirect) in which the block controllers 16 respond to signals generated by the PLC 18 to effect vehicle motion control as discussed below.

Thus, for example, in some embodiments, communications coupling between the PLC 18 and the block controllers 16 is effected via the central controller 18—or, put another way, all signaling by the PLC 18 to block controllers 16 in the set point-parameter controlled zone 24 takes place via the central controller 14. Such indirect communications coupling of the PLC and the block controllers via the central controller 14 has the advantage of permitting it (the central controller 14) to intervene in set point-parameter control by the PLC, e.g., when override is necessary (and a "fall back" to limit-based parameter control desirable) for safety or other reasons—including, by way of example, temporary or permanent manufacturing or product line reconfiguration, etc.)

In view of the foregoing, it will be appreciated that, in some embodiments, the PLC 18 may be coupled to all of the block controllers (e.g, directly or indirectly), and the central controller may place the PLC in communications coupling with various ones of the block controllers on a dynamic basis. Indeed, the subset of block controllers placed in that mode made vary over time such that different groupings of them (including all of them or none of them) may be in that mode at any one time.

Guideway 10

Guideway 10 of the illustrated embodiment houses propulsion coils 20 comprising the LSM motor, as well as position sensing logic, power electronic components, and microprocessors that serve as controllers for individual blocks 22, i.e., block controllers 16. In the drawing, the guideway 10 is depicted as a thick unbroken curved line; the blocks 22 are depicted by somewhat thinner broken-line segments overlaying the guideway, each of which segments represents an individual block and which segments, together, represent the blocks that make up the guideway 10; and, the coils are depicted by even thinner broken-line segments overlaying the blocks, each of which segments represents an individual coil and which segments, together, represent the coils that make up the individual blocks. To avoid clutter, only one block and one coil are labeled as such in the drawing.

The guideway 10 may be constructed in the manner of LSM guideways known in the art—as adapted in accord with the teachings hereof—and, preferably, in the manner of the guideway described and shown in incorporated-by-reference International Application No. PCT/US2010/021839 and U.S. patent application Ser. No. 12/692,441—again, as adapted in accord with the teachings hereof. Particular reference is had in this regard, by way of example, to the sections of the aforesaid incorporated-by-reference applications entitled "Guideway," "Low friction sliding surface," "Magnet array," and "Linear propulsion motor," as well as to the figures referred to in those sections. The guideway 10 may be of unitary construction, though, preferably, it is fabricated from modules, for example, of the type described in the aforesaid incorporated-by-reference applications in the section entitled "Guideway modules" and in the figures referred to in that section—again, as adapted in accord with the teachings hereof.

Illustrated guideway 10 is divided into two types of zones: set point-based parameter control zones 24 and limit-based parameter control zones 26. The former are denoted in the drawing by a dashed line of closely spaced segments (labeled 24) and correspond to zones of the guideway 10 in which the block controllers 26 are coupled to the PLC 18 (in addition to begin coupled to the central controller 14). The limit parameter-controlled zones are denoted by like dashed lines of wider spacing (labeled 26) and correspond to zones in which the block controllers 16 are shown coupled to the central controller 14, but not the PLC 18.

Vehicles 12

Vehicles 12 of the illustrated embodiment may be constructed in the manner of LSM vehicles known in the art—as adapted in accord with the teachings hereof—and, preferably, in the manner of the vehicles described and shown in the aforesaid incorporated-by-reference applications, e.g., in the section entitled "Guideway" and the figures referred to in that section again, as adapted in accord with the teachings hereof. Such vehicles may be of a double-bogey design, as also discussed in that section of the incorporated-by-reference applications and, again, as adapted in accord with the teachings hereof.

Controllers

Software for the controllers 14, 16 can be of the type known in the art, as adapted in accord with the teachings hereof, and, preferably, of the type described in the aforesaid incorporated-by-reference applications, by way of example, in the sections entitled "Linear propulsion motor" and "PC board mounted coils and control circuitry"—again, as adapted in accord with the teachings hereof.

In the illustrated embodiment, each block controller 16 governs powering of the coils 20 that make up the respective block 22 and, thereby, governs the velocity and acceleration of vehicles 12 as they pass over that block—and, more specifically, over the respective coils 20 of that block. To this end, each block controller 16 determines when individual vehicles enter and exit the block and/or the vehicle's position within the block. The block controller 16 then applies control signals to the power electronic components of the block to supply power to the coils 20 over which the vehicle is passing to effect a desired speed and acceleration.

Each block controller 16 preferably determines vehicle presence and position by monitoring the position sensing logic (which may be, for example, magneto-electric, optical or otherwise) of the respective block and/or by monitoring vehicle identification logic (e.g., RFID or otherwise), also of the respective block. In some embodiments, position and/or identification information is determined in other ways, alternatively or in addition. Thus, for example, that information can be determined by inference, e.g. based on information supplied from the other data processors 14, 16, 18.

With vehicle presence and position determined, the block controller 16 acquires velocity and acceleration set points for the vehicle. These may be supplied by the PLC 18, e.g., as in the case of a controller 16 in a block 22 that is in a set point-based parameter control zone 24 of the guideway 10; or, they may be calculated by the controller 16 as part of an overall motion profile for the vehicle, e.g., as in the case of a controller 16 in a block 22 that is in a limit-based parameter control zone 26 of the guideway 10.

Regardless, once the block controller 16 has determined velocity and acceleration set points for a vehicle passing over the respective block's coils 20, it applies control signals to the power electronic components of that block to supply current sufficient to achieve those set points. Those controlled signals can be determined by the block controller 16 via direct calculation and/or through use of DSP's or other affiliated logic. Moreover, the control signals can be applied to all of the coils 20 in the respective block 22, though, preferably, they are only applied to those coils above in which the vehicle is traveling.

Figure 4:
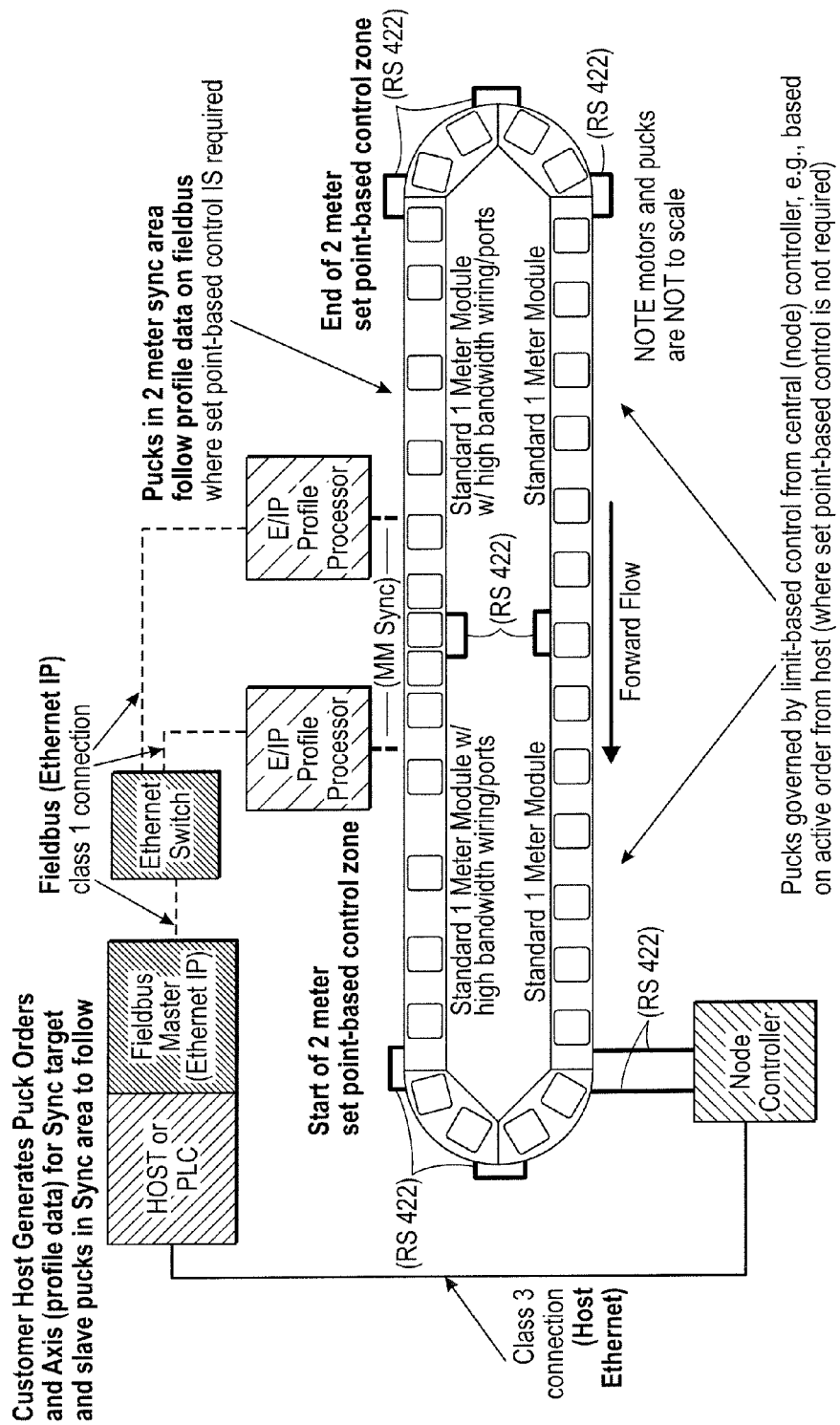
FIG. 4 depicts further aspects of a preferred guideway and control system of the type shown in FIG. 1.

FIG. 4 depicts further aspects of a preferred guideway and control system of the type shown in FIG. 1.

Limit-Based Parameter Control Zone 26

As noted above, a block controller over which a vehicle 12 is passing, e.g., exemplary controller 16a, can acquire—and, indeed, calculate—velocity and acceleration set points for the vehicle, e.g., as in the case of a controller 16 in a block 22 that is in a limit-based parameter control zone 26 of the guideway 10.

In these zones, the central controller 14 supplies the block controllers (here, represented by controllers 16a, 16b) with limit-based parameters which the block controllers, in turn, utilize to generate set points. Those limit-based parameters are, in the illustrated embodiment, final-position (in the drawing p(dest)), max-velocity (v(max)), and max-acceleration (a(max)). In other embodiments, a lesser or greater number of limit-based parameters may be utilized, e.g., final-position and max-velocity; final position and max-acceleration; jerk; and so forth.

In some embodiments, e.g., of the type shown in FIG. 4, the central controller 14 generates limit-based parameters in response to "orders" generated by the PLC (or host) 18.

In some embodiments, an individual set of limit-based parameters is supplied by the central controller 14 to the block controllers 16a, 16b for each vehicle and, accordingly, those parameters may be accompanied by a vehicle identification parameter (bogey ID). In other embodiments, the controller 14 supplies a single set of the parameters to the block controllers for all of the vehicles. The central controller 14 of still other embodiments employ a combination of the foregoing.

From the limit-based parameters, the block controller 16a can calculate a "motion profile" 28 that specifies the set points for vehicle velocity (v(set)) and vehicle acceleration (a(set)) as a function of position (p(set)) (or as a function of time) necessary (i) to move the vehicle over the guideway 10 to p(dest) without exceeding v(max) or a(max), and (ii) to avoid collision with vehicles on the same block 22a and/or downstream blocks 22b. The controller 16a can do so for all (or a number of) vehicle positions on the respective block 22a or, preferably, for all (or a number of) positions on the guideway between the vehicle's present position and the final position (as specified by the correspondingly named parameter).

Indeed, in some embodiments, each block controller 16a passes that more fully populated motion profile on to block controller 16b of downstream blocks 22b in the vehicle's path along the guideway 10, thereby, affording the downstream controller 16b the opportunity to refresh the profile, in lieu of recalculating it in entirety, as the vehicle passes over its respective blocks 22b. In the drawing, block controller 16a is shown passing merely the final values of p(set), v(set) and a(set) characterizing vehicle motion over block 22a, in lieu of the entire profile 28.

An advantage of vehicle 12 motion control of the type effected in limit-based parameter-controlled zone 26 of the guideway 10 is that it is distributed and scalable. For example, the processing necessary to monitor exact movements and calculate motion profiles for, potentially, tens, hundreds or thousands, of vehicles 12 can be distributed among the block controllers 16 for the many blocks 22 of the guideway over which those vehicles are traveling. By way of further example, it reduces the bandwidth necessary to carry control signals, motion profiles, vehicle position and/or identification information between the central controller 14 and the block controllers 16.

Set Point-Based Parameter Control Zone 24

As also noted above, a block controller 16 can acquire velocity and acceleration set points for a passing vehicle 12 directly from the PLC 18, e.g., as in the case of a controller 16c in a block 22c that is in a set point-based parameter-controlled zone 24 of the guideway 10. Block controllers 16c, 16d in these zones do not need to calculate motion profiles for vehicles passing over their respective blocks 22c, 22d and can rely, instead, on the PLC 18 for the set point data—and, specifically in the illustrated embodiment for incremental p(set), v(set) and a(set) (collectively, "profile data")—for which needed for power control signals are determined.

By way of caveat, in some embodiments, the block controllers 16 of a set point-based parameter control zone 24 can function identically to those of a limit-based parameter control zone—namely, calculating motion control profiles for passing vehicles and controlling the motion in accord therewith. Such is the case, for example, when the PLC 18 and/or the central controller 14 command the block controllers to "fall back" to limit-based parameter control, such for safety reasons—for example, in embodiments where the illustrated system is used in a "people mover" application, and where operations personnel and/or equipments detect a failure in PLC control (or in other equipment) necessitating override. Or, in manufacturing, production line or laboratory, as where there is a fault in a related apparatus or processes and/or where the block controllers detect a potential collision resulting from set point-based control and override it in favor of limit-based control. Indeed, such a fall-back or override can be effected on a per vehicle basis, e.g., as where the PLC 18 and/or the central controller 14 command the block controllers to utilize limit-based parameter control for vehicles detected, e.g., by quality assurance inspection or otherwise, as being unsuited for full processing.

Regardless, FIG. 2C depicts a table 30 of the sort that may be supplied by a field engineer operator—e.g., via a GUI editor or otherwise—to facilitate the PLCs control of vehicles 12 in the zone 24. As indicated by the table, the engineer (or other) can specify vehicle motion in the zone by giving position (e.g., as determined in accord with a guideway distances—here, represented by rule 32) as a function of time (e.g., as determined from a time of entrance of the vehicle into the zone 24 or otherwise). Such a table can be translated or "ported" by suitable means for execution in real time by the PLC.

An advantage of vehicle 12 motion control of the type effected in set point-based parameter control zone 24 of the guideway 10 is that such control can be precisely governed by the PLC, potentially, in concert with other manufacturing, production line, or other laboratory operations. To facilitate such control, the guideway (or modules therefore) utilized in zones 24 can include higher bandwidth wiring and additional ports suitable for (a) carrying control signals and data from the PLC 18 to the block controllers 16, and (b) carrying vehicle position and/or identification information from sensors in blocks 20 of the zones 24 to the PLC 18. Such "higher" bandwidth and "additional" ports are, for example, with respect to sections of the guideway in limit-based parameter-controlled zones 26 of the guideway.

Alternate Configurations

Guideways and transport systems according to the invention can be configured in a multitude of ways. As shown in FIG. 1, such a guideway 10 can have a main "track" portion (here, of oval shape) that is generally configured for limit-based parameter control. Yet, as shown in that drawing, the main track can have at least one zone configured for set point-based parameter control. Moreover, an auxiliary loading region of the track (defined by diverge and merge guideway sections) can also be configured for set point-based parameter control.

Figure 3C:
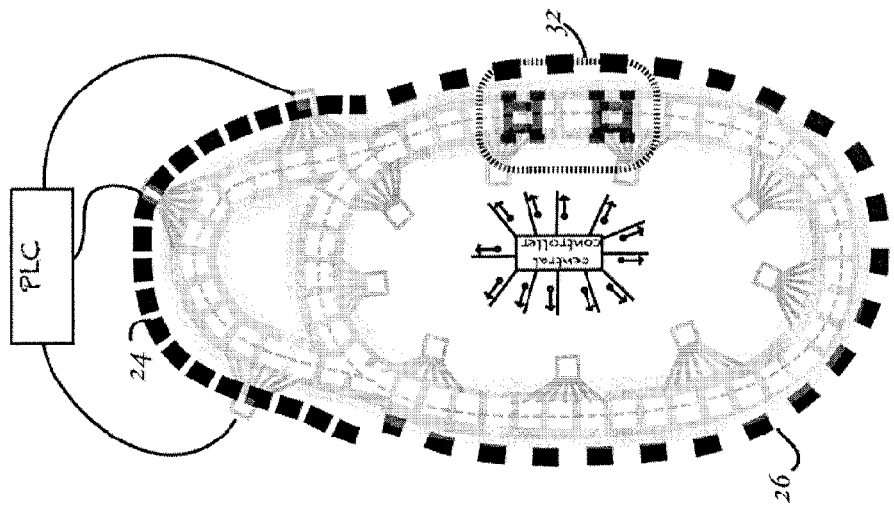
FIGS. 3a-c depict an alternate configuration of a guideway used in a transport system according to one practice of the invention.
Figure 3B:
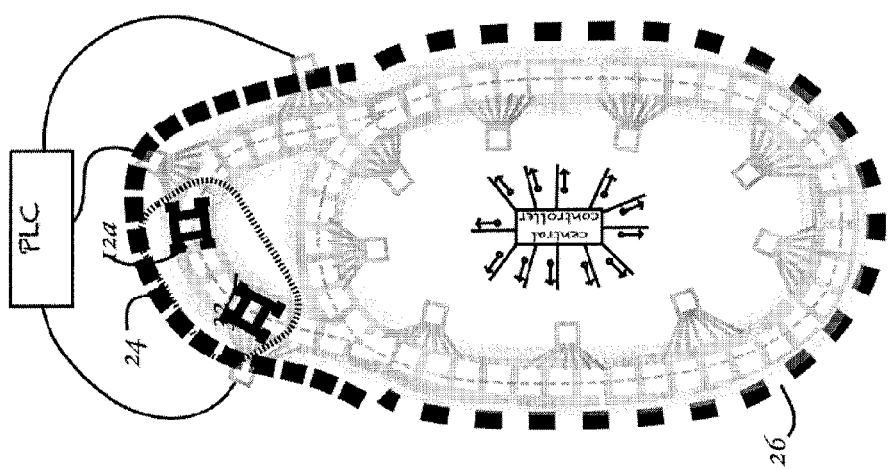
Figure 3A:
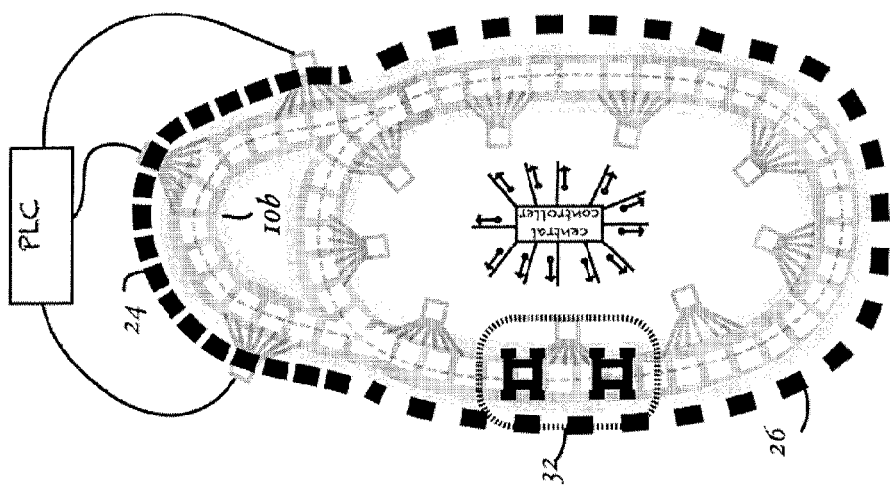

FIGS. 3a-c show an alternate configuration of the guideway that can be utilized, e.g., to control the orientation of a double-boogey vehicle 32. control the orientation of a double-bogey vehicle 32. In this configuration, the main track portion of the guideway is an elongate oval on which limit-based parameter control is used. This is suitable to effect movement and orientation of the vehicle so that its main axis 32a generally parallels the elongate axis of the guideway 10a while the vehicle 32 travels along the "long" sides of the oval.

Described above are systems and methods meeting the aforementioned objects. It will be appreciated that the illustrated embodiments are merely examples of the invention and that other embodiments, incorporating changes therein, are contemplated by the scope of the invention.

Thus, for example, though the various digital data processors, i.e., the central (or node) controller 14, the block (or motor) controllers 16, and the PLC 18, are shown and discussed separately herein, it will be appreciated that, in embodiments of the invention, one or more of them may be co-housed and/or the functions ascribed to one or more of them may be served by the other, or vice versa. Thus, for example, in some embodiments, the functions of the block controllers 16 discussed herein may be served by the central controller 14; the functions of the PLC may be served by the central controller 14 or vice versa; all, by way of non-limiting example.

By way of further example, in some embodiments, a vehicle moving through a set point-based parameter control zone need not be taken over by the PLC/host for setpoint-based control. Rather, the PLC/host can use any part of such a zone for set point-based parameter control and, indeed, can use multiple parts of such a zone for that purpose (e.g., as multiple shorter (disjoint) set point-based control zones).

Likewise, in some such embodiments, the PLC/host can assert set point-based control within such zones on a vehicle-by-vehicle basis, e.g., asserting set point-based control over some vehicles but not others within the zone.

As a consequence, for example, a vehicle that is moving under limit-based control can move through an ostensibly set point-based parameter control zone (without having set point-based control asserted on it by the PLC/host) and will exhibit anti-collision behavior with set point-based controlled vehicles in front of it in that zone (e.g., as long as those set point-based control vehicles do not move backward). Advantages of utilizing such a control scheme within ostensibly set point-based parameter control zones is that limit-based controlled vehicles in them will "play nice" (e.g., not collide) with set point-based controlled vehicles.

In view of the foregoing, what we claim is:

1. A transport system, comprising
   (a) a guideway including a plurality of propulsion coils disposed along a region in which one or more vehicles are to be propelled,
   (b) one or more vehicles disposed on the guideway, each containing a magnetic flux source,
   (c) electronic power and control circuitry that excites the propulsion coils independently so as to propel the one or more vehicles along the guideway,
   (d) a first set of one or more controllers and a second set of one or more controllers, wherein the first set of one or more controllers is coupled to the second set of one or more controllers, and wherein the second set of one or more controllers is coupled to the electronic power and control circuitry, (e) the guideway comprising at least (i) a first zone in which motion of vehicles thereon is commanded by application of set point-based parameters to the second set of controllers, and (ii) a second zone in which motion of vehicles thereon is commanded by application of limit-based parameters to the second set of controllers, (f) the first set of one or more controllers generates set point-based parameters for application to the second set of one or more controllers in order to control motion of vehicles in the first zone, (g) the first set of one or more controllers generate limit-based parameters for application to the second set of one or more controllers to control motion of vehicles in the second zone, and the second set of controllers generate set point parameters from those limit-based parameters, (h) the second set of controllers apply control signals to the electronic power and control circuitry based on set point parameters to control motion of vehicles in the first and second zones.

2. The transport system of claim 1, wherein the magnetic flux source comprises one or more Halbach or other magnet arrays.

3. The transport system of claim 1, wherein the limit-based parameters comprise one or more of final-position, max-velocity, max-acceleration, and/or jerk.

4. The transport system of claim 1, wherein the set point-based parameters comprise one or more of current or desired position, current or desired velocity and/or current or desired acceleration.

5. The transport system of claim 1, wherein the plurality of propulsion coils comprise an LSM motor and in which the guideway additionally comprises one or more of position sensing logic and power electronic components.

6. A method of transport, comprising
(a) providing a guideway including a plurality of propulsion coils disposed along a region in which one or more vehicles are to be propelled,
(b) providing one or more vehicles on the guideway,
(c) exciting the propulsion coils independently so as to propel the one or more vehicles along the guideway
(d) providing a first set of one or more controllers and a second set of one or more controllers, wherein the first set of one or more controllers is coupled to the second set of one or more controllers, and the second set of one or more controllers is coupled to the electronic power and control circuitry, (e) commanding motion of one or more of the vehicles in a first zone of the guideway by application of set point-based parameters to the second set of controllers, (f) commanding motion of one or of the vehicles in a second zone of the guideway by application of limit-based parameters to the second set of controllers, (g) generating, with the first set of one or more controllers, set point-based parameters for application to the second set of one or more controllers in order to control motion of vehicles in the first zone, (g) generating, with the first set of one or more controllers, limit-based parameters for application to the second set of one or more controllers to control motion of vehicles in the second zone, and the second set of controllers generate set point parameters from those limit-based parameters, (h) applying, with the second set of controllers, control signals to the electronic power and control circuitry based on set point parameters to control motion of vehicles in the first and second zones.

7. The method of claim 6, wherein one or more of the vehicles comprise one or Halbach arrays, other magnet arrays, and/or other magnetic flux sources.

8. The method of claim 6, wherein step E includes commanding motion of one or more of the vehicles in the second zone using limit-based parameters that comprise one or more of final-position, max-velocity, max-acceleration, and/or jerk.

9. The method of claim 6, wherein step D includes commanding motion using set point-based parameters that comprise one or more of current or desired position, current or desired velocity and/or current or desired acceleration.

10. The method of claim 6, wherein step A includes providing the guideway such that the plurality of propulsion coils comprise an LSM motor and such that the guideway additionally comprises one or more of position sensing logic and power electronic components.

11. The method of claim 10, wherein step E includes generating one or more of the limit-based parameters utilizing the central controller that is coupled to the one or more block controllers.

* * * * *